United States Patent
Nelson et al.

(10) Patent No.: US 7,043,499 B1
(45) Date of Patent: May 9, 2006

(54) METHOD AND APPARATUS FOR ACCESSING A DATABASE THROUGH A NETWORK

(75) Inventors: Mark R. Nelson, Plano, TX (US);
Jeffery A. Sanders, Plano, TX (US);
Alan W. Treece, Carrollton, TX (US);
William C. Forsythe, Frisco, TX (US);
Clay W. Luther, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/619,832

(22) Filed: Jul. 15, 2003

Related U.S. Application Data

(63) Continuation of application No. 09/746,272, filed on Dec. 21, 2000, now Pat. No. 6,601,065.

(51) Int. Cl.
*G06F 17/30* (2006.01)
(52) U.S. Cl. .................................................. 707/102
(58) Field of Classification Search ............... 707/2–4, 707/102
See application file for complete search history.

(56) References Cited

U.S. PATENT DOCUMENTS

| | | | |
|---|---|---|---|
| 5,850,433 A | 12/1998 | Rondeau | |
| 5,870,724 A * | 2/1999 | Lawlor et al. | 705/42 |
| 6,112,198 A * | 8/2000 | Lohman et al. | 707/3 |
| 6,327,628 B1 | 12/2001 | Anuff et al. | |
| 6,463,470 B1 | 10/2002 | Mohaban et al. | |
| 6,466,570 B1 * | 10/2002 | Low et al. | 370/352 |
| 6,484,177 B1 | 11/2002 | Van Huben et al. | |
| 6,490,564 B1 | 12/2002 | Dodrill et al. | |
| 6,490,591 B1 | 12/2002 | Denbar et al. | |
| 6,496,819 B1 * | 12/2002 | Bello et al. | 707/3 |
| 6,502,213 B1 * | 12/2002 | Bowman-Amuah | 714/49 |
| 6,507,817 B1 | 1/2003 | Wolfe et al. | |
| 6,671,508 B1 * | 12/2003 | Mitsuoka et al. | 455/412.1 |

* cited by examiner

*Primary Examiner*—Jeffrey Gaffin
*Assistant Examiner*—Haythim Alaubaidi
(74) *Attorney, Agent, or Firm*—Baker Botts L.L.P.

(57) ABSTRACT

A system includes a client which can communicate through a network and a database layer with any of several databases. The client communicates with the database layer using a public network communication protocol, in a manner independent of respective protocols specific to each of the databases. The database layer handles communication with each database according to the respective protocol of that database.

22 Claims, 2 Drawing Sheets

METHOD AND APPARATUS FOR ACCESSING A DATABASE THROUGH A NETWORK

CROSS-REFERENCE TO RELATED APPLICATION

This application is a continuation of U.S. application Ser. No. 09/746,272 filed Dec. 21, 2000, now U.S. Pat. No. 6,601,065 and entitled "Method and Apparatus for Accessing a Database Through a Network".

TECHNICAL FIELD OF THE INVENTION

This invention relates in general to database access by a client and, more particularly, to such access carried out through a network within which information is transmitted within digital message units.

BACKGROUND OF THE INVENTION

During recent years, the number of different types of databases in active use has been expanding, including recent popularity of databases compatible with the Lightweight Directory Access Protocol (LDAP). Other types of databases include large scale relational databases. Unfortunately, each of these types of database tends to have its own protocol for access. A further development is that, with the rapid expansion of the Internet and other types of computer networks, more and more of these databases are becoming available by network. However, due to the wide variety of protocols needed to access these various databases, it is difficult for any single application program to have all of the intelligence needed to handle all of these protocols and thus communicate with most or all of these types of databases.

In this regard, one type of device which has been growing in popularity is the Internet protocol (IP) telephone, which is coupled to and effects its telephony functions through a computer network. It is desirable that client devices such as these telephones be able to access much of the data present in the databases which are now available by network. However, it is not always practical for this class of devices to have the intelligence needed to handle a wide variety of different protocols corresponding to a variety of different databases.

SUMMARY OF THE INVENTION

From the foregoing, it may be appreciated that a need has arisen for a method and apparatus by which a client can access a repository through a network, where the client uses a protocol different from a protocol specific to the repository. According to the present invention, a method and apparatus are provided to address this need, and involve: providing a network through which can be transmitted message units that contain information in a digital form; transmitting from a client through the network a message which is in the form of at least one message unit and which contains a request directed to a repository, the request being in a first format compatible with a public network communication protocol; receiving the request from the network; thereafter converting the request from the first format to a second format compatible with a protocol of the repository; using the request in the second format to access the repository and obtain from the repository a response to the request, the response being in the second format; converting the response from the second format to the first format; and transmitting through the network to the client a further message which is in the form of at least one message unit and which contains the response in the second format.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
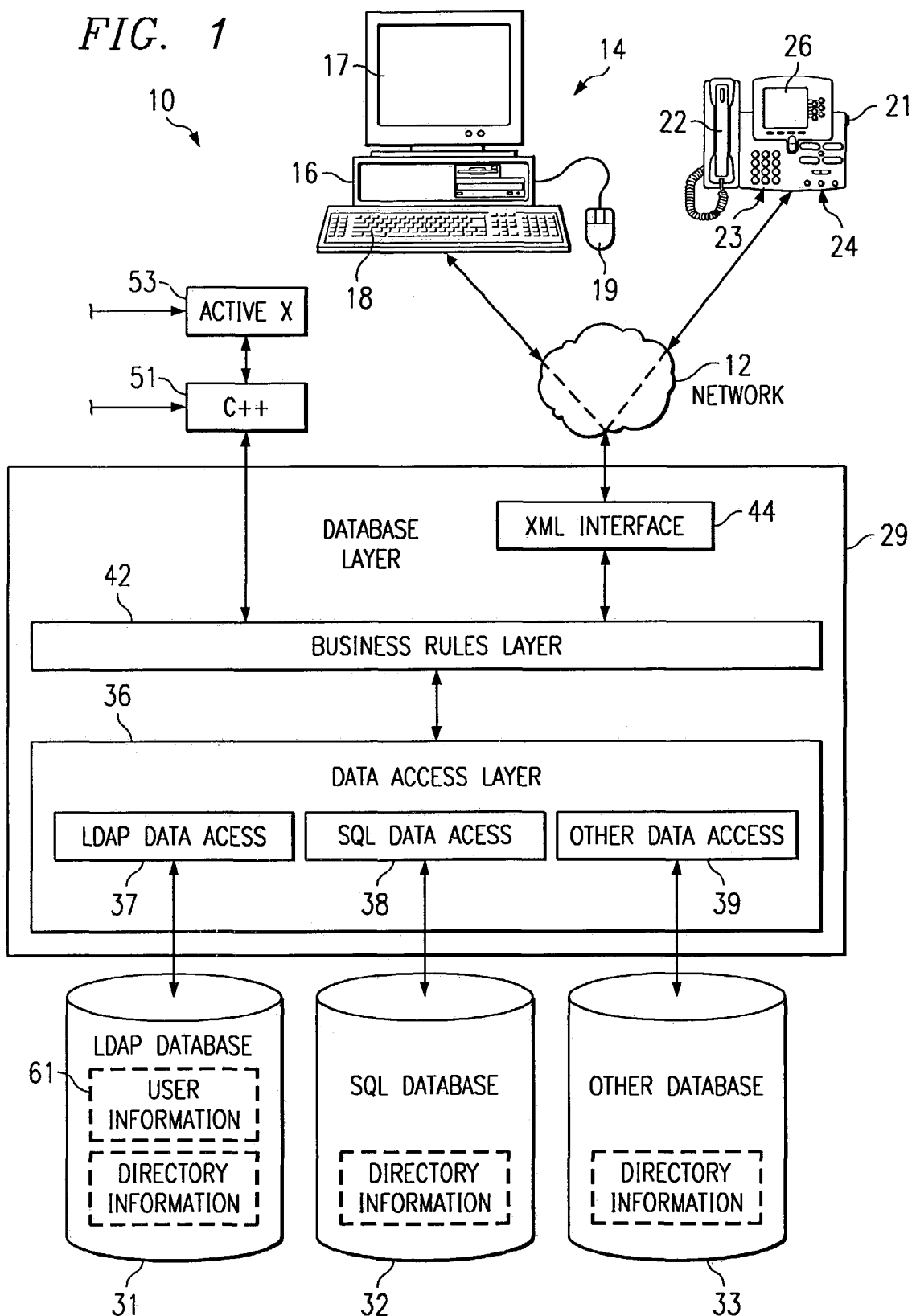
FIG. 1 is a block diagram of a system which embodies the present invention.

FIG. 1 is a block diagram of a system 10 which embodies the present invention. The system 10 includes a network 12, which is of a known type that is commonly used to transfer digital information between computers. Information is sent through the network 12 in the form of packets or message units, which include digital data and control information. In the disclosed embodiment, the network 12 includes a wide area network (WAN) such as the Internet, a local area network (LAN) such as an intranet compatible with the industry standard known as Ethernet, and/or a combination of such local and wide area networks.

The system 10 includes a computer 14, which is coupled to the network 12. The system 10 may actually include a plurality of such computers, but for clarity only one is shown in FIG. 1. In the disclosed embodiment, the computer 14 is of a type commonly known as a personal computer, which may for example be a personal computer obtained commercially from Dell Computer Corporation of Austin, Tex. The computer 14 includes a processor unit 16, a cathode ray tube (CRT) display 17, a keyboard 18, and a pointing device 19 such as a mouse.

The system 10 also includes a telephone 21 which is coupled to the network 12. The present invention contemplates that a number of such telephones will be coupled to the network 12 but, for clarity, only one is shown in FIG. 1. The telephone 21 is a type of telephone commonly referred to as an Internet protocol (IP) telephone. IP telephones carry out telephony functions by transmitting digital message units through packet switched networks, such as the network 12 of FIG. 1. The computer 12 and the telephone 21 can each function as a client on the network 12, in a manner which will be described in more detail later.

The telephone 21 includes a handset 22, and a number of manually operable push buttons, including a standard dialing keypad designated at 23, and a group of auxiliary push buttons designated at 24. The telephone 21 also includes a display 26, which in the disclosed embodiment is a liquid crystal display (LCD).

The system 10 further includes a database layer 29, which operatively couples the network 12 to three repositories or databases 31–33, which each store information. Interaction between the database layer 29 and the database 31 is carried out according to an industry standard protocol commonly known as the Lightweight Directory Access Protocol (LDAP). Interaction with the database 32 is carried out according to an industry standard protocol commonly known as the Structured Query Language (SQL) protocol, and interaction with the database 33 is carried out according to any other suitable protocol, which may be an industry standard protocol or a proprietary protocol. Although FIG. 1 shows three databases 31–33, the present invention is compatible with a system which includes only one database, or a system which includes a large number of databases. Further, even though FIG. 1 shows two databases that are specific to the LDAP and SQL protocols, the databases in the system could each conform to some other respective protocol.

The database layer 29 includes a data access layer 36, which is capable of communicating with each of the databases 31–33 according to its respective protocol. In this regard, the data access layer 36 includes an LDAP data access module 37 which can interact with the database 31 according to the LDAP protocol, an SQL data access module 38 which can interact with the database 32 according to the SQL protocol, and a data access module 39 which can interact with the database 33 according to some protocol other than LDAP or SQL. The database layer 29 also includes a business rules layer 42, which performs functions such as data validation and transaction control, and which maintains referential integrity.

The database layer 29 further includes an interface module 44, which is familiar with the markup language known in the industry as the extensible Markup Language (XML). XML is a public network communication protocol. XML interface module 44 serves as an XML parser and a request analyzer. In the disclosed embodiment, information is communicated through the network 12 between the XML interface 44 and the computer 14, and also between the XML interface 44 and the telephone 21, in packets or message units that contain information in a format which conforms to XML standards.

The system 10 also includes a module 51 which is operatively coupled to the business rules layer 42. The module 51 serves as a C++ object interface, and has a set of C++ objects that present to a not-illustrated external program an object-oriented view of the data in the databases 31–33. A further module 53 is operatively coupled to the module 51. The module 53 serves as an ActiveX object interface, and has a set of ActiveX objects that present to a not-illustrated external program an object-oriented view of the data in the databases 31–33.

The XML interface 44, the business rules layer 42, the data access layer 36, the databases 31–33, the C++ module 51, and the ActiveX module 53 could be implemented in the same computer, or in some combination of different computers. Where different computers are used, they may be directly coupled to each other, for example through a standard parallel or serial interface, or may be coupled to each other through the network 12 or some other computer network. The particular configuration of computer hardware provided to support these various system components need not be described here in detail. Those skilled in the art will recognize that the present invention is compatible with a wide variety of hardware configurations, and will readily understand what hardware configuration would be most appropriate for a particular implementation of the invention.

Communication through the network 12 between the database layer 29 and each of the computer 14 and the telephone 21 is carried out using messages which are expressed in the XML format, and which conform to a predefined protocol that is independent of the protocol of any particular database 31–33. In other words, all clients such as the computer 14 and the telephone 21 would format a given message in the same basic manner using XML, and each such message would have effectively the same form regardless of whether it was intended to access the database 31, the database 32, the database 33, or some other database. Consequently, the computer 14 and the telephone 21 do not each need to be familiar with a wide variety of communication protocols associated with the various databases 31–33, such as LDAP and SQL. In fact, an additional database using some new protocol could be added to the system 10, and the computer 14 and telephone 21 would continue to communicate with the XML interface 44 in the same basic manner used for all other databases, without any need to be provided with additional intelligence about the particular communication protocol associated with the newly-added database.

In the disclosed embodiment, and as noted above, the computer 14 and the telephone 21 each communicate with the XML interface 44 in substantially the same manner. Accordingly, for purposes of convenience, and to avoid redundant discussion, the following discussion will focus in greater detail on some examples of how communications can occur between the telephone 21 and the databases 31–33 through the XML interface 44. However, it should be kept in mind that communications between the computer 14 and the databases 31–33 would occur in a similar manner.

For purposes of the discussion which follows, it is assumed that the databases 31–33 each include telephone directory information, such as a list of names and associated telephone numbers. Further, it is assumed that the LDAP database 31 also stores, separately from the directory information, some user information 61. The user information 61 includes information regarding which users are authorized to access the directory information stored within the databases 31–33. The business rules layer 42 is aware that the user information 61 is stored in the LDAP database 31. Although the user information 61 is stored in the LDAP database 31 in the disclosed embodiment, the user information 61 could alternatively be stored in some other database.

As a first example, assume that a person using the telephone 21 wishes to access directory information in the LDAP database 31, for the specific purpose of obtaining the names and telephone numbers of all individuals in the directory who have a last name beginning with the three letters "Nel". After the person presses appropriate buttons on the telephone 21, in order to initiate this request, the telephone 21 transmits through the network 12 to the XML interface 44 an XML message, which is shown in the right column of TABLE 1. The information in the left column of TABLE 1 is not part of the message itself, but is provided solely for convenience in association with the following discussion, in order to facilitate accurate identification of which of the various lines of the message is currently being discussed.

Line 1 in TABLE 1 indicates that the message includes a "Request" for information, indicates that a parameter "async" is "false", and indicates that a parameter "sequenceID" has the value of "122". If the parameter "async" is set to "false", it means synchronous handling is needed, or in other words that an immediate reply is required. In contrast, if the parameter "async" is set to "true", it means that asynchronous handling is acceptable, which in turn means that a reply can be sent at a later time, when it is convenient, and that other messages can be passed back and forth in the interim. The "sequenceID" parameter is a number which will be included in the response so that, when the response is received, it can be correlated to the associated request shown in TABLE 1.

Line 2 in TABLE 1 includes information identifying the particular person who is currently using the telephone 21 to make the request, along with a password for that person. In particular, line 2 includes a user identification parameter "userid" which, for the particular person currently using the phone, happens to be "bob". Further, line 2 includes a password parameter titled "rsakey", which is set to a value that happens to be the current password for the person identified as "bob". Those skilled in the art will recognize that the "rsakey" is an industry standard form of a "public key". Messages sent to the public key's owner (for example "bob") can be safely encrypted using the public key such that only the owner can decrypt them. For purposes of the present invention, any other convenient form of password could alternatively be used, with or without encryption.

Line 3 in TABLE 1 is a tag identifying the specific type of request that is being made, which in this example is "GetDirectory". This means that the telephone 21 is asking for information from a directory. Line 4 identifies the database which is to be accessed, and identifies the server storing that database. In this example, they are defined by the term "ldap.cisco.com", which is the database 31 in FIG. 1.

Line 5 defines the inquiry which is to be applied to the selected database, in particular by defining a search for all last names meeting the definition "Nel*", where the asterisk is a "wild card" that can represent one or more characters. Line 6 in TABLE 1 is closing tag that corresponds to the tag in line 3, and line 7 is a closing tag that corresponds to the tag in line 1.

When the XML message in the right column of TABLE I is received at the database layer 29, the XML interface 144 parses the XML message, and supplies the information from this message to the business rules layer 42. The business rules layer 42 then formats and sends to the LDAP database 31 through the LDAP data access module 37a message which asks the LDAP database 31 to provide from the user information 61 any data which corresponds to the user identified by the authorization information in line 2 of TABLE 1. When the business rules layer 42 receives a response back from the LDAP database 31, it uses the response to evaluate the authorization information from line 2 in TABLE 1, in order to determine whether or not the user information 61 included a definition of a user having the user identification set forth in line 2 of the XML message and, if so, whether the password in the message is identical to the password defined for that user in the information 61. If the user identification and password are both proper, then the business rules layer 42 also determines from the data from the user information 61 whether the particular user making the request is authorized to access the specified database. The action taken by the business rules layer 42 in the event that it discovers a problem is discussed later. For the moment, it is assumed that the business rules layer 42 determines that the user identification and password are both proper, and that the particular user has authorization to access the database in question.

More specifically, assuming that no problem is noted, the business rules layer 42 passes information from the message to the data access layer 36, where the LDAP data access module 37 converts the request into a format compatible with the LDAP protocol, and then transmits the converted request to the LDAP database 31. The right column of TABLE 2 shows how the request from line 5 of TABLE 1 appears after it has been converted into the LDAP protocol.

Upon receipt of the request shown in TABLE 2, the database 31 searches its telephone directory for the requested information. For the sake of example, it is assumed that the directory in database 31 happens to include entries for two different individuals who each have a last name beginning with the three letters "Nel", namely an individual named Mark Nelson and an individual named Gordon Nelson. After identifying the entries for these two individuals, the database 31 transfers back to the data access module 37 the information from the entry in the database for Mark Nelson, followed by the information from the entry in the database for Gordon Nelson, in a form which corresponds to the LDAP protocol. This information provided by the database 31 is shown in the right column of TABLE 3. Lines 1–5 of TABLE 3 set forth the directory information for Mark Nelson, and lines 6–10 set forth the directory information for Gordon Nelson. This information from the database 31 is supplied through the business rules layer 42 to the XML interface 44. The XML interface 44 converts this information into an XML message, which is then transmitted from the XML interface 44 through the network 12 to the telephone 21. This XML message is shown in the right column of TABLE 4.

In TABLE 4, line 1 indicates that the message is a response to a "GetDirectory" request, and includes a "sequenceID" value of "122" in order to permit the XML message of TABLE 4 to be correlated to the XML message shown in TABLE 1. In other respects, line 1 of TABLE 4 is comparable to line 1 of TABLE 1, except for the inclusion of an "error" parameter. The error parameter indicates whether some form of system error was encountered, for example when attempting to access the database 31. In this example, the error parameter is set to "NoError", in order to indicate that no error was encountered in carrying out the specified request. In TABLE 4, lines 3–8 include the information for Mark Nelson which has been extracted from lines 1–5 in TABLE 3, and lines 9–14 of TABLE 4 include the information for Gordon Nelson which has been extracted from lines 6–10 of TABLE 3. Upon receipt of the message shown in TABLE 4, the telephone 21 can present the information for both Mark Nelson and Gordon Nelson on its display 26 in an appropriate format, so that the person using the telephone can view this information. The person may then elect to select and dial the displayed number for one of these individuals, or have the telephone 21 automatically dial the selected number.

As noted above, it was assumed the sake of example that the business rules layer 42 determined from data from the user information 61 that the person using the telephone 21 was authorized to access the database 31. On the other hand, if the business rules layer 42 had determined that either the user identification or the associated password was not correct, or that the user was not authorized to access the particular database 31, then the activities discussed above in association with TABLEs 2–4 would not have occurred. Instead, the business rules layer 42 would have instructed the XML interface 44 to send back to the telephone 21 the XML message which is shown in the right column of TABLE 5.

In the example of TABLE 5, it will be noted that the "error" parameter is set to "NoError", because the denial of access does not represent any form of error, but simply reflects the fact that the person in question does not have the authority needed for the request. This differs from a situation where the system encountered some form of error in attempting to access the database. Line 3 of TABLE 5 provides an indication to the telephone 21 that permission to access the database 31 has been denied. The telephone 21 can then present on its display 26 an indication to the person using the telephone 21 that access to the database 31 has been denied.

As a different example, assume that the person using the telephone 21 wishes to access directory information in the SQL database 32, rather than the directory information in the LDAP database 31. Also assume that, instead of searching for individuals having a last name beginning with the three letters "Nel", the goal is to search for any entry in the database which corresponds to an individual having the first name of "Addis". Based on input from the person using the telephone 21, the telephone 21 will prepare and send the XML message which is shown in the right column of TABLE 6. It will be noted that this message is almost identical to the message in TABLE 1, except that line 4 of TABLE 6 identifies a server and database "dal-ccml", which for purposes of this discussion is to be considered the SQL database 32. A further difference is that line 5 of TABLE 6 identifies a different query than line 5 of TABLE 1.

When the XML message of TABLE 6 is received by the database layer 29, the database layer 29 will process the message in a manner similar to that described above for the message of TABLE 1, including access to the user information 61 in the LDAP database 31, except that to obtain directory information the SQL data access module 38 will be used instead of the LDAP data access module 37. The module 38 will take the information extracted from the XML message in TABLE 6, convert it into an SQL query, and then send the SQL query to the database 32. The SQL query transmitted by the module 38 to the database 32 is shown in the right column of TABLE 7, and the reply which the database 32 provides back to the module 38 is shown in the right column of TABLE 8.

The database layer 29 then takes the information from the message of TABLE 8 and converts it into an XML message, which is shown in the right column of TABLE 9, and which is transmitted back through the network 12 to the telephone 21. It will be noted that the XML message of TABLE 9 is equivalent in format to the message of TABLE 4, except for the fact that the information in lines 3–7 of TABLE 9, which was obtained from the database 32, is different from the information in lines 3–7 and 9–13 of TABLE 4, which was obtained from the database 31. Thus, even though communication between the module 37 and the database 31 according to the LDAP protocol occurs in a manner significantly different from communication between the module 38 and the database 32 according to the SQL protocol, as evidenced by comparing the messages in TABLEs 2 and 7 and the messages in TABLEs 3 and 8, the communication between the telephone 21 and the database layer 29 is effectively the same for each database, as evident from a comparison of TABLE 1 to TABLE 6 and a comparison of TABLE 4 to TABLE 9.

In the foregoing examples, each message from the telephone 21 to the database layer 29 included authorization information, for example at line 2 in TABLE 1 and at line 2 in TABLE 6. As an alternative approach, it is possible for the person using telephone 21 establish a level of authorization before sending any message specific to any database. After that, the person can send one or more messages relating to databases which do not need to include any authorization information, because authorization has already been established.

As one example, the right column of TABLE 10 shows an XML message which could be transmitted from the telephone 21 to the database layer 29 for the sole purpose of establishing that the person currently using the telephone 21 is an authorized user. In this regard, line 2 of TABLE 10 includes authorization information similar to that discussed above in association with line 2 of TABLE 1 and line 2 of TABLE 6. Line 3 of TABLE 10 indicates that the message is a request for authentication, or in other words a request for notification that the person currently using the telephone 21 is an authorized user.

In response to the message of TABLE 10, the database layer 29 would initially interact with the LDAP database 31 in order to obtain data from the user information 61, in a manner similar to that discussed above in association with TABLE 1. After that, however, the database layer 29 would not have any further interaction with any of the databases 31–33. Instead, it would send back to the telephone 21 an XML message which indicates whether or not the request for authorization was successful. The right column of TABLE 11 is an example of such an XML message, where the word "Success" in line 2 of TABLE 11 indicates that the request was successful. If the request for authorization was not successful, the database layer 29 would send the telephone 21 an XML message similar to the message in TABLE 11, except that the word "Success" in line 2 would be replaced with a word such as "Failure" or "Denied".

If the authorization request shown in TABLE 10 was successful, and resulted in a reply like that shown in TABLE 11, then the telephone 21 could thereafter send a series of separate messages relating to one or more of the databases 31–33, and it would not be necessary to include authorization information in each such message. Thus, for example, the telephone 21 could send a message similar to the XML message shown in TABLE 1, except that line 2 of TABLE 1 could be omitted from the message. Similarly, telephone 21 could send a message similar to the XML message shown in TABLE 6, except that line 2 of the message could be omitted.

According to a further feature of the invention, when the database layer 29 sends to the telephone 21 a response to a request, the response may include not only the information which the telephone requested, but also additional information which is control information. This added control information defines some aspect of how the telephone should behave or operate, and the telephone 21 is programmed to understand the control information. In the disclosed embodiment, this additional control information is added by the database layer 29 to the directory information which it receives from any one of the databases 31–33.

As a specific example, the right column in TABLE 12 is an XML message which is identical to the XML message of TABLE 9, except for line 7. In particular, line 7 of TABLE 9 sets forth only the telephone number obtained from the directory, whereas line 7 of TABLE 12 sets forth not only the telephone number, but also additional control information. In particular, the control information in line 7 of TABLE 12 includes a parameter "allowDial" which can be either "true" or "false". If the "allowDial" parameter is true, then the telephone 21 will automatically dial the specified telephone number in the event that the person using telephone 21 requests that the number be automatically dialed. In contrast, if the "allowDial" parameter is false, the telephone 21 will not permit automatic dialing of the number.

It should also be noted that, in line 7 of TABLE 9, the telephone number is presented as one long number, whereas in line 7 of TABLE 12, the same telephone number has been split into a prefix portion and an extension portion. This permits the database layer 29 to control how many digits of the telephone number are in the prefix and how many digits are in the extension. If the telephone 21 is configured to display only the extension portion received from the database layer 29, then the database layer 29 can effectively control the manner in which the telephone 21 displays the extension information, in particular by controlling how the digits are split between the prefix portion and the extension portion.

Figure 2:
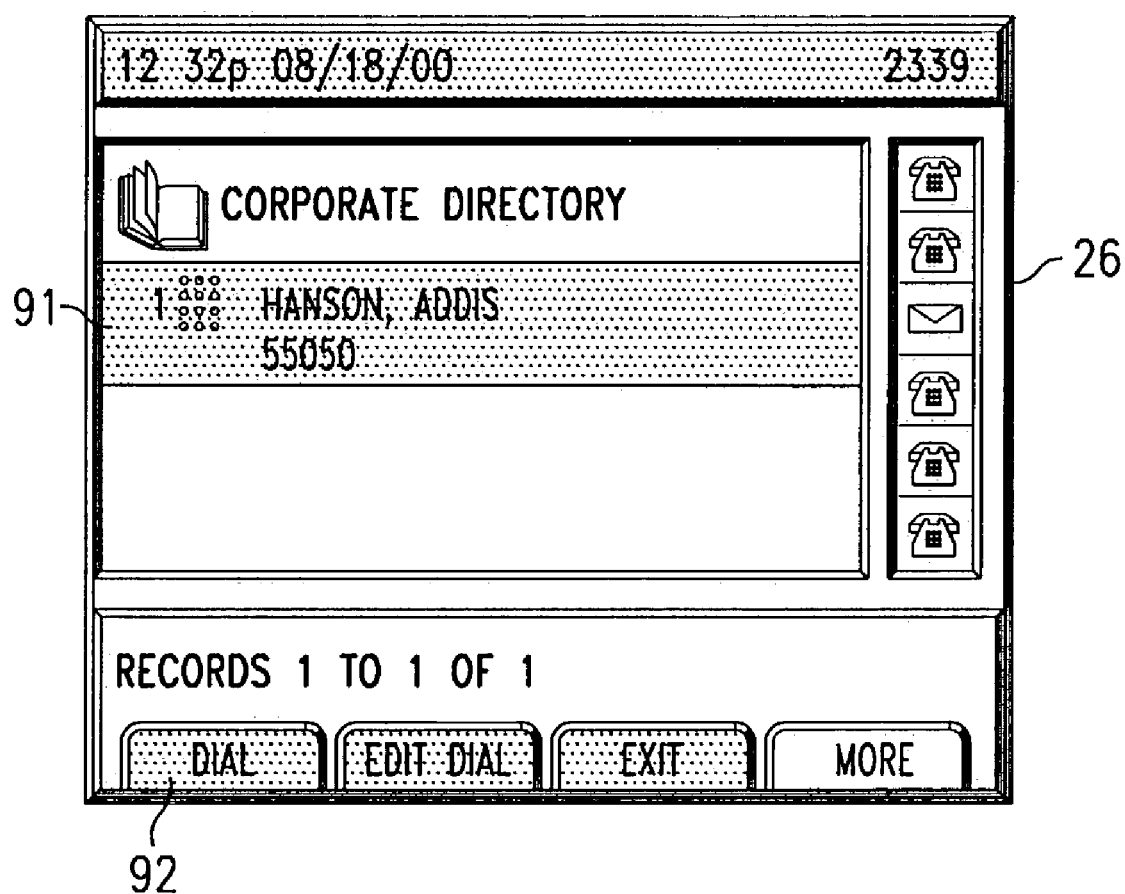
FIG. 2 is a diagrammatic view of a display which is a component of a telephone that is part of the system of FIG. 1.

FIG. 2 is a diagrammatic view of the display 26 of the telephone 21, and shows how the display 26 might present the directory information received in the XML message of TABLE 12. It will be noted that the single entry received from the directory in database 32 is presented at 91, and is highlighted in order to indicate that it is currently selected. Of course, if the database had returned two or more names, only one of the names would be selected and thus highlighted at any given point in time. It will also be noted that the entry 91 presents the five-digit extension portion as it appears in line 7 of TABLE 12, and does not display the associated prefix portion.

At the bottom of the display 26 in FIG. 2, the user is presented with a tab 92 which has the label "Dial", and which is highlighted in order to indicate that it is currently enabled. The tab 92 is highlighted in FIG. 2 because the "allowDial" parameter in line 7 of TABLE 12 was set to be "true". If it had been set to be "false", then the tab 92 would not be highlighted, or else would be grayed out, in order to indicate that the ability to automatically dial the number was disabled.

As evident from FIG. 1, the telephone 21 has four push buttons immediately below the display 26, one of which is immediately below the tab 92. If the tab 92 is highlighted, as shown in FIG. 2, then pushing the associated push button would cause the telephone 21 to automatically dial the telephone number associated with entry 91. Alternatively, if tab 92 was not highlighted, the user could push the corresponding push button below the tab 92, but the telephone 21 would not take any action.

The foregoing discussion has focused primarily on how the telephone 21 can interact through the network 12 and the database layer 29 with one or more of the databases 31–33. It is also possible for the telephone 21 to access the user information stored at 61 (FIG. 1). In this regard, the right column of TABLE 13 shows an XML message which the telephone 21 could transmit through the network 12 to the database layer 29 in order to request certain information stored at 61. It will be noted that lines 1 and 2 of TABLE 13 are similar to lines 1 and 2 of TABLE 1, and serve a similar function.

Line 3 of TABLE 13 specifies that the request is a "GetUser" request which relates to the user information 61, and includes a parameter "userid" which sets forth the user identification of the individual as to whom information is being requested. It will be noted from line 2 that the person using telephone 21 has a user identification of "bob". If this person were requesting information about himself or herself, then the user identification parameter in line 3 would also be set to "bob". However, in the example shown in TABLE 13, the user "bob" identified in line 2 is requesting information about a different user whose user identification is "claycle".

Lines 4 and 8 of TABLE 13 are a pair of related XML tags which delimit an identification of the specific items of information that the telephone 21 wants the database layer 29 to "Return" from the user information 61. As shown in lines 5–7, this includes the "FirstName", "LastName", and "Number" of the individual identified in line 3 of TABLE 13.

When the database layer 29 receives the XML message set forth in TABLE 13, it evaluates the authorization information set forth in line 2, in a manner similar to that described above for line 2 of the XML message in TABLE 1. Assuming that the database layer 29 determines that the user "bob" has authorization to make the request set forth in the message of TABLE 13, then the database layer 29 extracts the requested items from the data obtained from the user information 61, and sends those items back to the telephone 21 in the form of the XML message which is shown in the right column of TABLE 14. It is believed that, in light of the foregoing discussion, the XML message in TABLE 14 will be understandable without a detailed explanation of it.

According to still another feature of the present invention, the telephone 21 is provided with the capability to change or update selected user information stored at 61. A person might do this in order to change his or her password. This capability might also be used by a system administrator, in order to update information relating to other individuals, for example where information for a new employee needs to be entered into the system, or where an employee moves from one office to another office that has a different telephone extension number.

The right column of TABLE 15 is an XML message which the telephone 21 could send to the database layer 29 in order to change selected information about the user "claycle". In particular, line 4 of TABLE 15 sets forth the user identification of the individual to whom the update relates, and line 5 sets forth a new telephone number for that person, which is to be stored in the user information 61 in place of a prior telephone number.

When the database layer 29 receives the XML message of TABLE 15, it checks the authorization information in line 2, in a manner similar to that described above for line 2 of TABLE 1. Then, if the authorization information is acceptable, the database layer 29 interacts with the LDAP database 31 in a manner which implements the requested change to the user information 61. Thereafter, the database layer 29 sends back to the telephone 21 the XML message which is set forth in the right column of TABLE 16, and which indicates in line 2 that the update has been implemented.

A further feature of the invention relates to the fact that the database layer 29 is configured so that, following an update of the type discussed in association with TABLEs 15 and 16, the database layer 29 can send to a specified list of clients, such as the computer 14 and the telephone 21, a notification that a change has been made to the user information 61. In this regard, the right column of TABLE 17 is an example of such an XML message that the database layer 29 might send to various clients. Line 1 of TABLE 17 includes a "timestamp" parameter, which indicates the date and the time at which the update was made. Line 1 also includes a "severity" parameter, which indicates that this particular message has a "high priority". Line 2 sets forth the user identification for the individual as to whom the update was made, and line 3 identifies the particular parameter which was updated. In response to receipt of the message shown in TABLE 17, a person operating a client such as the computer 14 or the telephone 21 could optionally elect to request the updated information, which would result in the transmission of an XML message similar to that shown in TABLE 14.

In the foregoing discussion, it was assumed for the sake of clarity that the system 10 includes only one copy of the information in the LDAP database 31, only one copy of the information in the SQL database 32, and only one copy of the information in each database 33 of some other type. However, according to a further feature of the invention, the system 10 includes at least two copies of the information stored in each of the databases 31–33. These extra copies have been omitted from FIG. 1 for clarity. As one specific example, which focuses on the LDAP database 31, the system 10 includes at least two copies of the information stored in the LDAP database. One such copy is stored in a first server, and the other copy is stored in a second server that is physically separate from the first server. The database layer 29 selects one of these two servers to formally act as the LDAP database shown at 31 in FIG. 1.

More specifically, both of the two servers will be up and running during normal system operation, and the database layer 29 will select one of them to formally serve as the LDAP database 31. When information is needed from the LDAP database, it is obtained from the selected server that is currently acting as the LDAP database 31. If information is changed in the LDAP database in this selected server, a comparable change is made in the identical LDAP database stored in the non-selected server. If the selected server becomes non-operational, for example due to a hardware or software problem, the database layer 29 responds by automatically de-selecting the server experiencing the problem, while selecting the other server to act as the LDAP database 31. Consequently, operation of the overall system 10 continues without any interruption while the problematic server is being restored to its normal operational capability through appropriate service to the hardware and/or software.

It should be noted that the database layer 29 handles all administration and overhead relating to the multiple copies of each database, including selection and de-selection of these multiple copies, in a manner so that it is all invisible to clients such as the telephone 21 and the computer 14. In other words, these clients are not aware that there are multiple copies of any given database, only one of which is selected at any given point in time. Instead, these clients can act as if there is only one copy of each database, which is always operational and thus always available to them. Consequently, communications between these clients and the database layer 29 will be carried out in exactly the same manner no matter which server happens to be currently selected to serve as the active copy of a given database.

TABLE 1

| 1 | \<Request async="false" sequenceID="122"\> |
|---|---|
| 2 | \<SecurityKey userid="bob" rsakey="aa5f3222ccdee020"/\> |
| 3 | \<GetDirectory\> |
| 4 | \<Server\>ldap.cisco.com\</Server\> |
| 5 | \<LastName\>Nel*\</LastName\> |
| 6 | \</GetDirectory\> |
| 7 | \</Request\> |

TABLE 2

| 1 | &(sn=Nels*)(objectClass=person) |
|---|---|

TABLE 3

| 1 | dn:uid=mrn,ou=Users,o=cisco.com |
|---|---|
| 2 | cn: Mark Nelson |
| 3 | surName: Nelson |
| 4 | givenName: Mark |
| 5 | telephoneNumber: 972-555-5131 |
| 6 | dn:uid=nels,ou=Users,o=cisco.com |
| 7 | cn: Gordon Nelson |
| 8 | surName: Nelson |
| 9 | givenName: Gordon |
| 10 | telephoneNumber: 408-555-1122 |

TABLE 4

| 1 | \<Response for="GetDirectory" sequenceID="122" async="false" error="NoError"\> |
|---|---|
| 2 | \<Directory\> |
| 3 | \<Entry userid="mrn"\> |
| 4 | \<Name\>Mark Nelson\</Name\> |
| 5 | \<FirstName\>Mark\</FirstName\> |
| 6 | \<LastName\>Nelson\</LastName\> |
| 7 | \<Number\>972-555-5131\</Number\> |
| 8 | \</Entry\> |
| 9 | \<Entry userid="nels"\> |
| 10 | \<Name\>Gordon Nelson\</Name\> |
| 11 | \<FirstName\>Gordon\</FirstName\> |
| 12 | \<LastName\>Nelson\</LastName\> |
| 13 | \<Number\>408-555-1122\</Number\> |
| 14 | \</Entry\> |
| 15 | \</Directory\> |
| 16 | \</Response\> |

TABLE 5

| 1 | \<Response for="GetDirectory" sequenceID="122" async="false" error="NoError"\> |
|---|---|
| 2 | \<Directory\> |
| 3 | \<Reply\>PermissionDenied\</Reply\> |
| 4 | \</Directory\> |
| 5 | \</Response\> |

TABLE 6

| 1 | \<Request async="false" sequenceID="123"\> |
|---|---|
| 2 | \<SecurityKey userid="bob" rsakey="aa5f3222ccdee020"/\> |
| 3 | \<GetDirectory\> |
| 4 | \<Server\>dal-ccm1\</Server\> |
| 5 | \<FirstName\>Addis\</FirstName\> |
| 6 | \</GetDirectory\> |
| 7 | \</Request\> |

TABLE 7

| 1 | SELECT * from Users WHERE FirstName = 'Addis' ORDER BY LastName |
|---|---|

TABLE 8

| 1 | aeh, Addis Hanson, Addis, Hanson, 972-555-5050 |
|---|---|

TABLE 9

| 1 | \<Response for="GetDirectory" sequenceID="123" async="false" error="NoError"\> |
|---|---|
| 2 | \<Directory\> |
| 3 | \<Entry userid="aeh"\> |
| 4 | \<Name\>Addis Hanson\</Name\> |
| 5 | \<FirstName\>Addis\</FirstName\> |
| 6 | \<LastName\>Hanson\</LastName\> |
| 7 | \<Number\>972-555-5050\</Number\> |
| 8 | \</Entry\> |
| 9 | \</Directory\> |
| 10 | \</Response\> |

TABLE 10

| 1 | \<Request async="false" sequenceID="124"> |
|---|---|
| 2 | \<SecurityKey userid="bob" rsakey="aa5f3222ccdee020"/> |
| 3 | \<Authentication/> |
| 4 | \</Request> |

TABLE 11

| 1 | \<Response for="Authentication" sequenceID="124"" async="false" error="NoError"> |
|---|---|
| 2 | \<Reply>Success\</Reply> |
| 3 | \</Response> |

TABLE 12

| 1 | \<Response for="GetDirectory" sequenceID="123" async="false" error="NoError"> |
|---|---|
| 2 | \<Directory> |
| 3 | \<Entry userid="aeh"> |
| 4 | \<Name>Addis Hanson\</Name> |
| 5 | \<FirstName>Addis\</FirstName> |
| 6 | \<LastName>Hanson\</LastName> |
| 7 | \<DialableNumber allowDial=True prefix="997255">55050\</DialableNumber> |
| 8 | \</Entry> |
| 9 | \</Directory> |
| 10 | \</Response> |

TABLE 13

| 1 | \<Request async="false" sequenceID="125"> |
|---|---|
| 2 | \<SecurityKey userid="bob" rsakey="aa5f3222ccdee020"/> |
| 3 | \<GetUser userid="claycle"> |
| 4 | \<Return> |
| 5 | FirstName |
| 6 | LastName |
| 7 | Number |
| 8 | \</Return> |
| 9 | \</GetUser> |
| 10 | \</Request> |

TABLE 14

| 1 | \<Response for="GetUser" sequenceID="125" async="false" error="NoError"> |
|---|---|
| 2 | \<User userid="claycle"> |
| 3 | \<FirstName>Clay\</FirstName> |
| 4 | \<LastName>Luther\</LastName> |
| 5 | \<Number>972-555-3004\</Number> |
| 6 | \</User> |
| 7 | \</Response> |

TABLE 15

| 1 | \<Request async="false" sequenceID="126"> |
|---|---|
| 2 | \<SecurityKey userid="bob" rsakey="aa5f3222ccdee020"/> |

TABLE 15-continued

| 3 | \<UpdateUser> |
|---|---|
| 4 | \<User userid="claycle"> |
| 5 | \<Number>972-555-6117\</Number> |
| 6 | \</User> |
| 7 | \</UpdateUser> |
| 8 | \</Request> |

TABLE 16

| 1 | \<Response for="UpdateUser" sequenceID="126" async="false" error="NoError"> |
|---|---|
| 2 | \<Reply>Updated\</Reply> |
| 3 | \</Response> |

TABLE 17

| 1 | \<Notification async="true" timestamp="2000-08-10 09:15:45:0345" sequenceID="465" severity="high"> |
|---|---|
| 2 | \<User userid="claycle"> |
| 3 | \<Changes>Number\</Changes> |
| 4 | \</User> |
| 5 | \</ChangeNotification> |

The present invention provides a number of technical advantages. One such advantage is that a client can access a database through a network using a public network communication protocol, in a manner which is effectively independent of any particular database and its associated protocol. According to a related feature, it is advantageous if the public network communication protocol is the extensible Markup Language (XML), thereby avoiding complex syntax encoding rules (such as those associated with ASN.1). XML also is advantageous because it is compatible with third party browsers and tools that support XML.

A further advantage results from the provision of capability to authenticate a user on a message level or on a session level, in a manner which is also independent of any particular database and its associated protocol. Still another advantage results from the capability to provide, in reply to a request from a client, a response which includes not only requested information, but also control information that affects the behavior or operation of the client. Yet another advantage relates to the capability for a client to change information that is stored in some other device. A related advantage is the capability for the other device to automatically send notification to one or more clients that an update has occurred in the stored information.

Although one embodiment has been illustrated and described in detail, it will be understood that various substitutions and alterations can be made therein without departing from the spirit and scope of the present invention, as defined by the following claims.

What is claimed is:

1. A method for accessing a database, comprising the steps of:

receiving a first request in a first format compatible with a public network communication protocol;

converting the first request to a second request, the second request in a second format compatible with a repository protocol;

transmitting the second request to a repository;

receiving from the repository a first response in the second format, the first response including control information and requested information, wherein the requested information comprises a telephone number and the control information comprises an autodial indicator associated with the telephone number, wherein the autodial indicator indicates whether a telephone permits automatic dialing of the telephone number;

converting the first response to a second response, the second response in the first format and the second response including the control information and the requested information; and transmitting the second response to the telephone to be used by the telephone to display the telephone number and to determine an autodial status of the telephone number.

2. The method of claim 1, wherein the public network communication protocol comprises the eXtensible Markup Language (XML).

3. The method of claim 1, wherein the repository protocol comprises one of the Structured Query Language (SQL) protocol and the Lightweight Directory Access Protocol (LDAP).

4. The method of claim 1, wherein the first request further comprises authentication information, and wherein receiving a first request comprises:

receiving a first request in a first format compatible with a public network communication protocol; and determining a level of authorization based on the authentication information.

5. The method of claim 1, wherein the control information is used by the telephone to determine which digits of the telephone number to display.

6. A system for storing information comprising:

a telephone operable to communicate using a public network communication protocol;

a repository operable to store information and operable to communicate using a repository protocol; and an interface coupled to the repository and operable to communicate using the public network communication protocol, wherein the interface is further operable to:

receive a request in a first format from the telephone;

convert the request to a second format;

transmit the request to the repository;

receive from the repository a response in the second format, the response including control information and requested information, wherein the requested information comprises a telephone number and the control information comprises an autodial indicator associated with the telephone number, wherein the autodial indicator indicates whether the telephone permits automatic dialing of the telephone number;

convert the response to the first format; and transmit the response to the telephone;

wherein the telephone is further operable to:

display the telephone number to a user;

present an autodial option to the user based on the autodial indicator; and dial the telephone number for the user in response to the user selecting the autodial option.

7. The system of claim 6, wherein the public network communication protocol is the extensible Markup Language (XML).

8. The system of claim 6, wherein the repository protocol is one of the Structured Query Language (SQL) protocol and the Lightweight Directory Access Protocol (LDAP).

9. The system of claim 6, wherein the request includes authentication information, and wherein the interface is further operable to receive a request by:

receiving a request in a first format from the telephone; and evaluating the authentication information to determine an authorization status.

10. The system of claim 6, wherein the control information is used by the telephone to determine which digits of the telephone number to display.

11. An apparatus for accessing a database comprising:

a first interface operable to receive a request for information communicated according to a public communication protocol;

a translation module coupled to the first interface and operable to translate the request from the public network communication protocol to a repository protocol;

a second interface coupled to the translation module and operable to couple to a repository and to communicate the request to the repository according to the repository protocol, the second interface further operable receive a response communicated according to the repository protocol, the response including control information and requested information, wherein the requested information comprises a telephone number and the control information comprises an autodial indicator associated with the telephone number, wherein the autodial indicator indicates whether a telephone permits automatic dialing of the telephone number;

the translation module further operable to translate the response from the repository protocol to the public network communication protocol; and the first interface further operable to couple to the telephone and to communicate the response to the telephone according to the public communication protocol to be used by the telephone to display the telephone number and to determine an autodial status of the telephone number.

12. The apparatus of claim 11, wherein the public network communication protocol comprises the extensible Markup Language (XML).

13. The apparatus of claim 11, wherein the repository protocol comprises one of the Structured Query Language (SQL) protocol and the Lightweight Directory Access Protocol (LDAP).

14. The apparatus of claim 11, wherein the control information is used by the telephone to determine which digits of the telephone number to display.

15. The apparatus of claim 11, wherein the request further comprises authentication information, and wherein the second interface is further operable to communicate a request by:

determining a level of authorization based on the authentication information; and communicating a request based on the authentication information.

16. The apparatus of claim 11, wherein the first interface, the second interface, and the translation module are integrated into a single physical component.

17. A computer program stored on a computer readable medium, the computer program operable to:

receive a first request in a first format compatible with a public network communication protocol;

convert the first request to a second request, the second request in a second format compatible with a repository protocol;

transmit the second request to a repository;

receive from the repository a first response in the second format, the first response including control information and requested information, wherein the requested information comprises a telephone number and the control information comprises an autodial indicator associated with the telephone number, wherein the autodial indicator indicates whether a telephone permits automatic dialing of the telephone number;

convert the first response to a second response, the second response in the first format and the second response including the control information and the requested information; and transmit the second response to the telephone to be used by the telephone to display the telephone number and to determine an autodial status of the telephone number.

18. The computer program of claim 17, wherein the public network communication protocol comprises the extensible Markup Language (XML).

19. The computer program of claim 17, wherein the repository protocol comprises one of the Structured Query Language (SQL) protocol and the Lightweight Directory Access Protocol (LDAP).

20. The computer program of claim 17, wherein the first request further comprises authentication information, and wherein the computer program is further operable to receive a first request by:

receiving a first request in a first format compatible with a public network communication protocol; and determining a level of authorization based on the authentication information.

21. The computer program of claim 17, wherein the control information is used by the telephone to determine which digits of the telephone number to display.

22. A system for accessing a database comprising:

means for receiving a first request in a first format compatible with a public network communication protocol;

means for converting the first request to a second request, the second request in a second format compatible with a repository protocol;

means for transmitting the second request to a repository;

means for receiving from the repository a first response in the second format, the first response including control information and requested information, wherein the requested information comprises a telephone number and the control information comprises an autodial indicator associated with the telephone number, wherein the autodial indicator indicates whether a telephone permits automatic dialing of the telephone number;

means for converting the first response to a second response, the second response in the first format and the second response including the control information and the requested information; and means for transmitting the second response to a client the telephone to be used by the telephone to display the telephone number and to determine an autodial status of the telephone number.

* * * * *